2,975,216
CATALYTIC ALKYLATION OF PHENOL

Ronald B. Spacht, Kent, Ohio, assignor, by mesne assignments, to The Goodyear Tire & Rubber Company, a corporation of Ohio No Drawing. Filed June 10, 1958, Ser. No. 741,007

4 Claims. (Cl. 260—624)

This invention relates to the preservation of rubber, and more particularly to the provision and use of a new class of nonstaining or nondiscoloring age resistors for rubber.

Rubber is subject to deterioration from many sources, such as sunlight, ozone, atmospheric oxygen, presence of heavy metals, etc. Both cured and uncured natural and synthetic elastomers are subject to deterioration. Deterioration in cured stock may likewise vary with the type of stock, the state of cure, the amount of surface exposed and the temperature at which the rubber is being used. An ideal antioxidant would be one which would protect rubber from deterioration regardless of kind, in the cured or uncured state, no matter where used. Since no such antioxidant has been discovered, compromises must be made in the selection of an antioxidant for use in rubber.

With the increasing demand for white or light-colored rubber articles there arose a need for antioxidants which would not discolor or stain objects in contact with rubber. The older antioxidants produced very bad discoloration and staining. Certain alkylated phenols have been found to be antioxidants which produce little discoloration or staining. While many phenols have some antioxidant activity, there is a great difference between various phenols as to their degree of discoloration of rubber goods.

The effectiveness of a phenolic antioxidant will vary with the degree of alkylation, the type of alkyl groups present and the location of the substituent alkyl groups. Furthermore, the vapor pressure of the phenolic molecule is of particular importance for certain uses, i.e. for high temperature uses and for uses wherein large rubber surfaces are exposed. Again compromises may have to be made, for example, a good antioxidant may be too volatile for general usage while, on the other hand, a non-volatile material may be a poor antioxidant.

According to the present invention, a class of phenols has been discovered which exhibit unusual and unexpected antioxidant activity, and which are relatively non-volatile. They exhibit a high degree of protection for rubber against sunchecking and against atmospheric oxygen, produce little or no discoloration in rubber, and are also nonstaining. Furthermore, they are derived from cheap raw materials and hence possess an economic advantage over most antioxidants of this general class.

The customary phenolic antioxidant is quite volatile because of the difficulty of effecting heavy alkylation, most phenolic antioxidants being cresol derivatives. Now, it has been found that, by selecting the alkyl substituents carefully and by reacting them with phenol in a stepwise order, a class of antioxidants may be produced easily and economically which has low volatility and which displays excellent antioxidant properties. The age resistors of this invention which can be produced in this manner, are phenols having at least two unlike tertiary alkyl radicals attached to the ring, at least one of the radicals being selected from the group consisting of tertiary octyl and tertiary nonyl radicals and at least one being selected from the group consisting of tertiary butyl and tertiary amyl radicals.

In the practice of this invention, the alkylated phenolic compounds can be made by reacting phenol with an olefin selected from the group consisting of tertiary octenes and tertiary nonenes and then with another olefin selected from the group consisting of isobutylene and tertiary amylenes. Mixtures of octenes and/or nonenes and mixtures of isobutylene and/or amylenes can be used, if desired.

Many alkylated phenols have not proved to be good antioxidants. This may be due to the fact that the action of the OH group must be inhibited in order to have a good antioxidant. For this purpose large groups ortho to the hydroxyl are desirable. The size of these groups is limited, however, by the fact that heavy chains are not easily attached and by the fact that the composition would become too costly and difficult to make to use as an antioxidant if the chains were too large.

It has been discovered that certain phenols having tertiary groups in the ortho and para positions are superior antioxidants, the best antioxidants being tritertiary alkyl substituted phenols. By the practice of this invention, the maximum effect is obtained by securing tritertiary substitution of the phenol nucleus with octyl, nonyl, butyl or amyl groups. In order to obtain the desired antioxidants the heavier tertiary olefin is reacted with phenol first and thereafter the product of that reaction is reacted with the lighter tertiary olefin.

While the invention includes the isolation and use of the individual compounds, the composite reaction products are preferred as age resistors, since their use saves the additional costs of purification or separation. The products may be produced from pure compounds or from mixtures of compounds.

For best results the reaction temperature during alkylation will ordinarily be maintained within a range of 50° C. to 150° C. If the temperature is too high, the alkylation catalyst may become a catalyst for dealkylation. During the second stage of the alkylation process, it is often desirable to maintain the temperature below 90° C. in order to prevent dealkylation and in order to obtain more complete alkylation. The temperature will of course vary with variations in customary reaction conditions such as, for example, pressure, catalyst used, etc.

In the practice of the invention, one or more of the customary acidic alkylation catalysts is used to activate and accelerate the reactions. For example, sulfuric acid, benzene sulfonic acid, toluene sulfonic acid, activated clays, stannic chloride, ferrous chloride, boron trifluoride, zinc chloride, the ferrous and ferric halides, the stannous and stannic halides, aluminum halide and aluminum oxide will catalyse the reactions. Usually, concentrated sulfuric acid is used as the alkylation catalyst. However, it has been noted that reaction products of this invention produced by a concentrated sulfuric acid catalytic system exhibit a pronounced yellow color which is carried over into the rubber when synthetic rubbers containing them are made by emulsion polymerization. Such polymers are often undesirable from the standpoint of sales appeal even though the color does not carry over into white or light colored vulcanizates. It has been discovered that this problem of coloration can be overcome by using particular combinations of the herein-disclosed acidic alkylation catalysts. In particular, it has been discovered that combinations of acid-activated clay and sulfuric acid are effective catalysts which provide non-discolored polymers. Tests have shown that the clay does not merely absorb the color as might be expected because known acid-activated bleaching clays have failed to remove color from sulfuric-acid catalyzed reaction products of this invention. The catalyst may be comprised of a mixture of an acid-activated clay and sulfuric acid in a ratio of about 1 to 7 parts by weight of clay to 1 part by weight of acid. The clay may be dry or it may contain from 0 to 15% by weight of water. Also, the catalysts may be used in sequence, if desired, the clay being used to activate the first alkylation step and the sulfuric acid being added to the mixture for the second step. Although useful in preparing any of the reaction products disclosed herein, when diisobutylene is used as the olefin in the first reaction step and isobutylene is used as the olefin in the second reaction step, it has been discovered that best results are achieved by using a mixture of an acid-activated clay and sulfuric acid in a ratio of 1 to 7 parts by weight of clay to 1 part by weight of acid in both steps of the alkylation process.

The products of this invention, produced by the catalyst systems claimed herein and further described in the following examples, were tested for color by incorporating 2 parts by weight of antioxidant in 100 parts by weight of rubber as follows:

Twenty-five grams of a 6% sodium oleate-water solution were heated to 140 to 160° F. and thereafter added with stirring to 25 grams of the antioxidants to provide an emulsion. Then 1.34 grams of the 50% emulsion were added to 200 grams of SBR hot latex containing about 17% rubber solids comprised of a copolymer containing about 75% by weight of butadiene and 25% by weight of styrene. This is a ratio of approximately 2 parts by weight of antioxidant to 100 parts by weight of rubber. The sodium oleate solution was used only as an emulsifying agent to aid dispersion of the antioxidant in the latex. Obviously, any other emulsifying agent may be used for this purpose, as well-known in the art. Latex, containing the antioxidant, was poured into 100 milliliters of a 10% sodium chloride solution and thereafter coagulated with dilute sulfuric acid wherein the pH was reduced to about 3 to 4. The crumb rubber was washed thoroughly with water and oven-dried for 16 hours at 158° F. Thereafter, the rubber was examined visually for discoloration and compared to a control containing no antioxidant.

In the following table, the antioxidant used was the reaction product of phenol, diisobutylene, and isobutylene, as described in Example 1, the only change being the variations in the catalysts shown in the table.

TABLE 1

*Color of products stabilized with the reaction products of phenol, diisobutylene, and isobutylene*

| Catalyst | Quantity/Mole Phenol | Color of Final Rubber |
| --- | --- | --- |
| Control | No Antioxidant | Almost white. |
| H₂SO₄ | 6 grams | Very yellow. |
| H₂SO₄ | 2 grams | |
| Activated Clay—15% H₂O | 6 grams | } Almost white. |
| H₂SO₄ | 2 grams | |
| Activated Clay—dry | 6 grams | } Very light yellow. |
| H₂SO₄ | 2 grams | |
| Activated Clay—3% H₂O | 6 grams | } Almost white. |
| H₂SO₄ | 5⅓ grams | |
| Activated Clay—3% H₂O | 2⅔ grams | } Very light yellow. |

The catalyst will ordinarily be used in an amount of at least 0.5% of the total weight of reactants, i.e., phenol plus olefins, but larger amounts of catalyst, for example, up to 10.0% by weight of the reactants, are also satisfactory.

By the process of the invention a phenolic antioxidant can be obtained which is substantially trialkylated with tertiary alkyl radicals. In order to obtain the desired alkylation, the phenol must be reacted with the tertiary octene or tertiary nonene as the first step in the process, the use of at least one mol of tertiary octene or tertiary nonene per mol of phenol being necessary in order to obtain at least monoalkylation of a substantial portion of the phenol molecules. When only one mol of tertiary octene or tertiary nonene is used in the first step, it becomes necessary to use at least two mols of a tertiary butene or a tertiary pentene in the second step in order to obtain the desired trialkylation. It is preferred to use more than one mol of the tertiary octene or tertiary nonene per mol of phenol in the first step of the process because it is desirable to obtain phenolic reaction products having more than one position on the phenolic ring substituted with the heavier alkyl radicals. Still more preferred is the use of at least two mols of the tertiary octene or nonene. More than two mols of tertiary octene or tertiary nonene per mol of phenol can be used in the first step in order to insure that a substantial portion of the phenolic reaction products will be dialkylated with tertiary octyl or tertiary nonyl radicals. At least one mol of isobutylene and/or tertiary amylene must be used and the total amount of olefin must be at least three mols per mol of phenol.

It is possible to obtain a phenolic antioxidant reaction product in which a major portion of the phenolic molecules will be dialkylated with either a tertiary octyl or a tertiary nonyl group and monoalkylated with either a tertiary butyl or a tertiary amyl group. Because of chemical selectivity, one tertiary octyl or tertiary nonyl group will normally attach to the position para to the hydroxyl and the other ortho to the hydroxyl. This would leave the other ortho position available for a tertiary butyl or tertiary amyl group. If sufficient octylene or nonylene is not used for substantially complete dialkylation, the tertiary octyl or tertiary nonyl radical will attach to the paraposition, leaving the two ortho positions available for the tertiary butyl or tertiary amyl groups. These two types of compounds account for a substantial portion of the reaction product, i.e. at least 60% of the total composition, and under proper reaction conditions will amount to about 85% to 95% of the total composition. Other compounds which can be present in the reaction product in varying but minor amounts are (1) the disubstituted phenols in which both substituents are di-tertiary octyl (or nonyl) or di-tertiary butyl (or amyl) or in which one substituent is tertiary octyl (or nonyl) and the other substituent is tertiary butyl (or amyl) and (2) the tri-substituted phenols in which all three substituents are tertiary octyl (or nonyl) on the one hand or tertiary butyl (or amyl) on the other.

Preferably, an excess of the heavier olefin is used, i.e., more than two mols of olefin for each mol of phenol, thus insuring a major proportion of dialkylation with the heavier reactant. It is thus possible to obtain up to about 50% to 75% of the reaction product comprised of phenolic molecules having dialkylation with octyl or nonyl groups and monoalkylation with butyl or amyl groups. The remaining reaction products will be various proportions and combinations of other di- and tri-tertiary alkyl phenols with alkylation in the para and ortho positions, almost no alkylation occurring in the meta positions. An excess of tertiary butylene or amylene in the second step tends to promote complete reaction to the trisubstituted compounds.

The preferred antioxidant composition of this invention is a mixture of tertiary alkylated phenols which have the structural formula

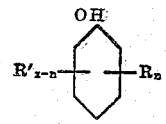

wherein $x$ is an integer ranging from 2 to 3, $n$ is an integer ranging from 0 to 3 but not exceeding the value of $x$, wherein R is selected from the group consisting of tertiary butyl and tertiary amyl and R' is selected from the group consisting of tertiary octyl and tertiary nonyl, R and R' being attached to the benzene ring in the 2, 4 and 6 positions with respect to the hydroxyl group, and wherein a major proportion of said mixture is comprised of tri-tertiary-alkylated phenols wherein two of said tertiary alkyl radicals are selected from the group consisting of tertiary octyl and tertiary nonyl radicals and wherein the third tertiary alkyl radical is selected from the group consisting of tertiary butyl and tertiary amyl radicals.

The reaction product can also be described as a mixture of phenols having the structural formula

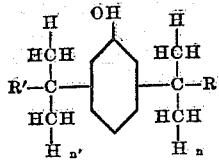

wherein $n$ and $n'$ are integers ranging from 1 to 2, but not totalling more than 3, wherein R is a monovalent radical selected from the group consisting of $CH_3$ and $C_2H_5$ and R' is selected from the group consisting of $C_5H_{11}$ and $C_6H_{13}$, wherein alkylation of the phenolic ring is in the 2, 4 and 6 positions, and wherein a major proportion of said mixture is comprised of tri-tertiary-alkylated phenols wherein two of said tertiary alkyl radicals are selected from the group consisting of tertiary octyl and tertiary nonyl radicals and the third tertiary alkyl radical is selected from the group consisting of tertiary butyl and tertiary amyl radicals.

The preparation of the products of the invention is illustrated by the following examples:

EXAMPLE 1

Nine hundred and forthy grams of phenol, 60 grams of an acid activated clay containing 3% water and 20 grams of concentrated $H_2SO_4$ were mixed and heated to 80° C. Twenty-two hundred and forty grams of diisobutylene were added between 80 and 90° C. over a three hour period. The mixture was held at 80° C. for one hour and then 560 grams of isobutene were added in one and a half hours. The catalyst was destroyed with aqueous $Na_2CO_3$. The volatiles and unreacted materials were removed by heating to a column temperature of 160° C. at 18 millimeters of mercury pressure. Three thousand and nineteen grams of product were obtained.

EXAMPLE 2

Three hundred and seventy-six grams of phenol, 30 grams of an activated clay containing 15% moisture and 10 grams of concentrated $H_2SO_4$ were mixed and heated to 80° C. Eight hundred and ninety-six grams of diisobutylene were then added between 80 and 90° C. in two hours. The mixture was held at 80° C. for two hours. Then 294 grams of isobutene were added over a two hour period. Fifteen grams of $Na_2CO_3$ dissolved in water were added to destroy the catalyst. Volatiles were removed by heating under vacuo at 15 millimeters of mercury pressure to a column temperature of 150° C. The yield was 1,242 grams.

EXAMPLE 3

Ninety-four grams of phenol, 5⅓ grams of a dry acid activated clay and 2⅔ grams of $H_2SO_4$ were heated to 80° C. Two hundred and twenty-four grams of diisobutylene were then added in two hours. The mixture was allowed to react two hours longer at 80° C. Then 66.5 grams of isobutylene were added in one hour. An aqueous $Na_2CO_3$ solution was added to destroy the catalyst. Volatiles were removed as in previous examples. The yield was 338.5 grams.

EXAMPLE 4

Three hundred and seventy-six grams of phenol, twenty- two and three tenths grams of an acid activated clay containing 15% moisture and ten and seven-tenths grams of concentrated $H_2SO_4$ were mixed and heated to 80° C. Eight hundred and ninety-six grams of diisobutylene were then added between 80 and 90° C. in three hours. After holding one hour at 80° C. 258 grams of isobutylene were added in 1¼ hours. The catalyst was destroyed and the volatiles removed as usual. The yield was 1,289 grams.

EXAMPLE 5

Ninety-four grams of phenol, 5⅓ grams of a dry acid activated clay and 2⅔ grams of concentrated $H_2SO_4$ were mixed and heated to 80° C. Two hundred and twenty-four grams of diisobutylene were then added in a two-hour period keeping the temperature between 75 and 85° C. The mixture was held at 80° C. for two hours and then 83.0 grams of isobutene were added in 1¼ hours at 80° C. The catalyst was destroyed and the volatiles removed as usual. The yield was 320.0 grams.

EXAMPLE 6

Ninety-four grams of phenol, 6 grams of a dry acid activated clay and 2 grams of concentrated $H_2SO_4$ were mixed and heated to 80° C. Two hundred and twenty-four grams of diisobutylene were added in two hours. The reaction mixture was held at 80° C. for two more hours. Eighty-seven grams of isobutylene were then added in 1½ hours. The catalyst was destroyed and the volatiles removed as usual. The yield was 322 grams.

EXAMPLE 7

Ninety-four grams of phenol, nine grams of a dry activated clay and three grams of concentrated $H_2SO_4$ were heated to 80° C. Two-hundred and twenty-four grams of diisobutylene were then added between 80 and 85° C. in 2¼ hours. The mixture was held at 80° C. for 2 hours longer. One hundred and three grams of isobutene were then added in a two hour period at a temperature between 80 and 85° C. The catalyst was destroyed and the volatiles removed as usual. The yield was 332.0 grams.

EXAMPLE 8

Ninety-four grams of phenol, 6 grams of an acid activated clay containing 3% water and 2.0 grams of sulfuric acid were mixed and heated to 70° C. Two hundred and twenty-four grams of diisobutylene were then added between 65 and 70° C. in 2½ hours. The mixture was held at 70° C. two hours longer. Then 73.5 grams of isobutylene were added during two hours. The catalyst was destroyed and the volatiles removed as usual. The yield was 318.5 grams.

EXAMPLE 9

Ninety-four grams of phenol, 6.0 grams of an acid activated clay containing 15% moisture and 2.0 grams of $H_2SO_4$ were heated to 80° C. One hundred and twelve grams of diisobutylene were added in 1¼ hours between 80 and 85° C. The mixture was held at 80° C. for ½ hour. One-hundred and thirty-five grams of isobutylene were then added in two hours. The catalyst was destroyed and the volatiles removed as usual. The yield was 289 grams.

EXAMPLE 10

Ninety-four grams of phenol, 6.0 grams of a dry acid activated clay and 2.0 grams of $H_2SO_4$ were heated to 80° C. One hundred and twelve grams of diisobutylene were added between 80 and 85° C. in ½ hour. The mixture was held at 80° C. for another ½ hour. One hundred and twenty grams of isobutylene were then added between 80 and 85° C. in 1 hour. The catalyst was destroyed and the volatiles removed as usual. The yield was 302 grams.

Similar compounds have been prepared as in Examples 1–10 except that one or more nonenes have been used instead of diisobutylene. Also, similar compounds have been prepared as in Examples 1–10 wherein one or more nonenes have been used instead of diisobutylene and an amylene has been used instead of isobutylene.

While certain representative embodiments and details have been shown for the purpose of illustrating the invention, it will be apparent to those skilled in this art that various changes and modifications may be made therein without departing from the spirit or scope of the invention.

This application is a continuation-in-part of Serial No. 379,089, filed September 8, 1953.

I claim:

1. A method of preparing a mixture of alkyl phenols having the structural formula

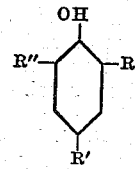

wherein R is a radical selected from the group consisting of tertiary octyl, tertiary nonyl, tertiary butyl, and tertiary amyl radicals and R' is a radical selected from the group consisting of tertiary octyl and tertiary nonyl radicals and R" is a radical selected from the group consisting of tertiary butyl and tertiary amyl radicals, which comprises first preparing a tertiary alkyl phenol containing 1 to 2 tertiary alkyl substituents selected from the group consisting of tertiary octyl and tertiary nonyl by alkylating one mol of phenol with at least one mol of at least one olefin selected from the group consisting of tertiary octenes and tertiary nonenes in the presence of from 0.5 to 10.0 percent by weight, based on the weight of reactants, of a catalyst comprised of a mixture of an acid-activated clay and sulfuric acid in a ratio of about 1 to 7 parts by weight of clay to 1 part by weight of acid at a temperature of 50° C. to 150° C. and then alkylating the alkylated product of the first step with at least one mol of at least one other olefin selected from the group consisting of isobutylene and tertiary amylenes in the presence of from 0.5 to 10.0 percent by weight, based on the weight of reactants, of a catalyst comprised of a mixture of an acid-activated clay and sulfuric acid in a ratio of about 1 to 7 parts by weight of clay to 1 part by weight of acid at a temperature of 50° C. to 90° C., the total amount of olefin used being at least 3 mols per mol of phenol.

2. The process according to claim 1 wherein the catalyst is comprised of a mixture of an acid-activated clay containing from 0 to 15 percent by weight of water, based on the weight of the clay, and sulfuric acid in a ratio of about 1 to 7 parts by weight of clay to 1 part by weight of acid.

3. The method of preparing a mixture of alkyl phenols having the structural formula

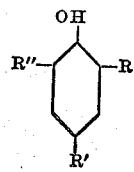

wherein R is a radical selected from the group consisting of tertiary octyl and tertiary butyl radicals, R' is a tertiary octyl radical and R" is a tertiary butyl radical which comprises first preparing a tertiary octyl phenol containing 1 to 2 tertiary octyl substituents by alkylating one mol of phenol with at least one mol of a tertiary octene in the presence of from 0.5 to 10.0 percent by weight, based on the weight of reactants, of a catalyst comprised of a mixture of an acid-activated clay and sulfuric acid in a ratio of about 1 to 7 parts by weight of clay to 1 part by weight of acid at a temperature of 50° C. to 150° C. and then alkylating the alkylated product of the first step with at least one mol of isobutylene in the presence of from 0.5 to 10.0 percent by weight, based on the weight of reactants, of a catalyst comprised of a mixture of an acid-activated clay and sulfuric acid in a ratio of about 1 to 7 parts by weight of clay to 1 part by weight of acid, at a temperature of 50° C. to 90° C., the total amount of olefin used being at least three mols per mol of phenol.

4. A method of preparing a mixture of alkyl phenols comprising the steps of reacting one molecular equivalent of phenol with at least one molecular equivalent of an olefin selected from the group consisting of tertiary octenes and tertiary nonenes in the presence of from 0.5 to 10.0% by weight, based on the weight of reactants, of a catalyst comprised of a mixture of an acid activated clay and sulfuric acid in a ratio of about 1 to 7 parts by weight of clay to 1 part by weight of acid at a temperature of 50° C. to 150° C. and then alkylating the alkylated product of the first step with at least one molecular equivalent of at least one other olefin selected from the group consisting of isobutylene and tertiary amylenes in the presence of from 0.5 to 10.0% by weight, based on the weight of reactants, of a catalyst comprised of a mixture of an acid activated clay and sulfuric acid in a ratio of about 1 to 7 parts by weight of clay to 1 part by weight of acid at a temperature of 50° C. to 90° C., the total amount of olefin used being at least 3 molecular equivalents per molecular equivalent of phenol.

References Cited in the file of this patent

UNITED STATES PATENTS

| | | |
|---|---|---|
| 2,008,017 | Hester | July 16, 1935 |
| 2,283,438 | Hentrich et al. | May 19, 1942 |
| 2,337,123 | Olin et al. | Dec. 21, 1943 |
| 2,415,069 | Arvin et al. | Feb. 4, 1947 |
| 2,434,833 | Ciapetta | Jan. 20, 1948 |
| 2,560,037 | Kitchen | July 10, 1951 |
| 2,732,048 | Foote | Jan. 24, 1956 |

OTHER REFERENCES

Stillson et al.: J. Amer. Chem. Soc., vol. 67 (1945), pages 303–307 (5 pages).